United States Patent
Yamasaki et al.

(10) Patent No.: US 11,524,708 B2
(45) Date of Patent: *Dec. 13, 2022

(54) AUTOMATED DRIVING ENABLED VEHICLE

(71) Applicant: SUBARU CORPORATION, Tokyo (JP)

(72) Inventors: Kentarou Yamasaki, Tokyo (JP); Makoto Kinoshita, Tokyo (JP); Keisuke Takayama, Tokyo (JP); Yuta Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 228 days.

This patent is subject to a terminal disclaimer.

(21) Appl. No.: 16/987,077

(22) Filed: Aug. 6, 2020

(65) Prior Publication Data

US 2021/0094586 A1    Apr. 1, 2021

(30) Foreign Application Priority Data

Sep. 26, 2019  (JP) ............................. JP2019-175680

(51) Int. Cl.
*B60W 60/00*  (2020.01)
*B60Q 1/34*  (2006.01)
(Continued)

(52) U.S. Cl.
CPC ........... *B60W 60/0053* (2020.02); *B60Q 1/34* (2013.01); *B60Q 1/50* (2013.01); *B60W 30/06* (2013.01)

(58) Field of Classification Search
CPC ............. B60W 60/0053; B60W 30/06; B60W 60/005; B60Q 1/34; B60Q 1/50;
(Continued)

(56) References Cited

U.S. PATENT DOCUMENTS

| 8,930,085 B2 | 1/2015 | Takeuchi et al. |
| 10,053,001 B1 | 8/2018 | Nabbe et al. |

(Continued)

FOREIGN PATENT DOCUMENTS

| EP | 3369621 A1 * | 9/2018 | ........... B60Q 1/2603 |
| GB | 2571149 A | 8/2019 | |

(Continued)

OTHER PUBLICATIONS

U.S. PTO Non-Final Office Action issued in related U.S. Appl. No. 16/983,674, dated Apr. 29, 2021.

(Continued)

*Primary Examiner* — Daryl C Pope

(74) *Attorney, Agent, or Firm* — McDermott Will & Emery LLP

(57) ABSTRACT

An automated driving enabled vehicle includes a travel controller, an automated driving indicator lamp, and a lamp controller. The travel controller controls the travel of the vehicle by automated driving in a normal movement mode and in an automatic parking mode. The normal movement mode includes allowing the vehicle to travel, and the automatic parking mode includes parking the vehicle by the automated driving in a parking lot. The lamp controller controls a lighting state of the automated driving indicator lamp during the execution of the automated driving to a first lighting state in the normal movement mode, and to a second lighting state different from the first lighting state in the automatic parking mode.

8 Claims, 7 Drawing Sheets

(51) Int. Cl.
*B60W 30/06* (2006.01)
*B60Q 1/50* (2006.01)

(58) Field of Classification Search
CPC ........ B60Q 1/488; B60Q 1/507; B60Q 1/543; B60Q 1/346; B60Q 1/46; B60Q 1/0035
See application file for complete search history.

(56) References Cited

U.S. PATENT DOCUMENTS

| | | | |
|---|---|---|---|
| 10,195,902 | B1 | 2/2019 | Lee et al. |
| 2017/0057542 | A1 | 3/2017 | Kim et al. |
| 2017/0225567 | A1 | 8/2017 | Tsuda |
| 2017/0229053 | A1 | 8/2017 | Ishizuka et al. |
| 2017/0334455 | A1 | 11/2017 | Asakura et al. |
| 2018/0017969 | A1 | 1/2018 | Nagy et al. |
| 2018/0086260 | A1 | 3/2018 | Barillot et al. |
| 2018/0173237 | A1 | 6/2018 | Reiley et al. |
| 2018/0304804 | A1 | 10/2018 | Tatara et al. |
| 2018/0312106 | A1 | 11/2018 | Tatara et al. |
| 2018/0334088 | A1 | 11/2018 | Salter et al. |
| 2018/0356818 | A1 | 12/2018 | Arai et al. |
| 2019/0066548 | A1 | 2/2019 | Dellock et al. |
| 2019/0084585 | A1 | 3/2019 | Fritz et al. |
| 2019/0111784 | A1 | 4/2019 | Tsuda |
| 2019/0168664 | A1 | 6/2019 | Tatara et al. |
| 2019/0210517 | A1 | 7/2019 | Baker et al. |
| 2019/0248421 | A1 | 8/2019 | Jacobsthal et al. |
| 2019/0270406 | A1 | 9/2019 | Dubey et al. |
| 2020/0031274 | A1 | 1/2020 | Redick et al. |
| 2020/0130573 | A1 | 4/2020 | Ito |
| 2020/0156532 | A1 | 5/2020 | Le et al. |
| 2020/0307648 | A1* | 10/2020 | Noguchi ......... B60W 60/00253 |
| 2021/0201885 | A1 | 7/2021 | Bastyr et al. |

FOREIGN PATENT DOCUMENTS

| | | |
|---|---|---|
| JP | 2018-032433 A | 3/2018 |
| JP | 2019-064471 A | 4/2019 |

OTHER PUBLICATIONS

U.S. PTO Notice of Allowance issued in related U.S. Appl. No. 16/983,674, dated Sep. 2, 2021.
U.S. PTO Non-Final Office Action issued in related U.S. Appl. No. 16/985,953, dated Apr. 22, 2022.
U.S. PTO Non-Final Office Action issued in related U.S. Appl. No. 16/983,614, dated Dec. 29, 2021.
U.S. PTO Notice of Allowance issued in related U.S. Appl. No. 16/987,135 dated Jun. 6, 2022.
U.S. PTO Non-Final Office Action issued in related U.S. Appl. No. 16/987,174, dated Jun. 9, 2022.
U.S. PTO Notice of Allowance issued in related U.S. Appl. No. 16/987,174 dated Nov. 2, 2022.
U.S. PTO Final Office Action issued in related U.S. Appl. No. 16/985,953, dated Sep. 21, 2022.

* cited by examiner

AUTOMATED DRIVING ENABLED VEHICLE

CROSS-REFERENCE TO RELATED APPLICATIONS

This application claims priority from Japanese Patent Application No. 2019-175680 filed on Sep. 26, 2019, the entire contents of which are hereby incorporated by reference.

BACKGROUND

The technology relates to an automated driving enabled vehicle.

As to vehicles, research and development of automated driving, or automation of vehicle travel, has been in progress.

For example, vehicles in the future are expected to travel to a destination by an automatic control in response to setting of the destination, and to stop and park at the destination.

SUMMARY

An aspect of the technology provides an automated driving enabled vehicle including a travel controller, an automated driving indicator lamp, and a lamp controller. The travel controller is configured to control travel of the vehicle while switching a travel control state between automated driving and manual driving. The automated driving indicator lamp is configured to be switched on perceptibly from outside the vehicle on the occasion of the automated driving. The lamp controller is configured to switch on the automated driving indicator lamp to indicate that the travel control state is the automated driving, during execution of the automated driving in which the travel controller controls the travel of the vehicle by the automated driving. The travel controller is configured to control the travel of the vehicle by the automated driving in a normal movement mode and in an automatic parking mode. The normal movement mode includes allowing the vehicle to travel, and the automatic parking mode includes parking the vehicle by the automated driving in a parking lot. The lamp controller is configured to control a lighting state of the automated driving indicator lamp during the execution of the automated driving to a first lighting state in the normal movement mode, and to a second lighting state different from the first lighting state in the automatic parking mode.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
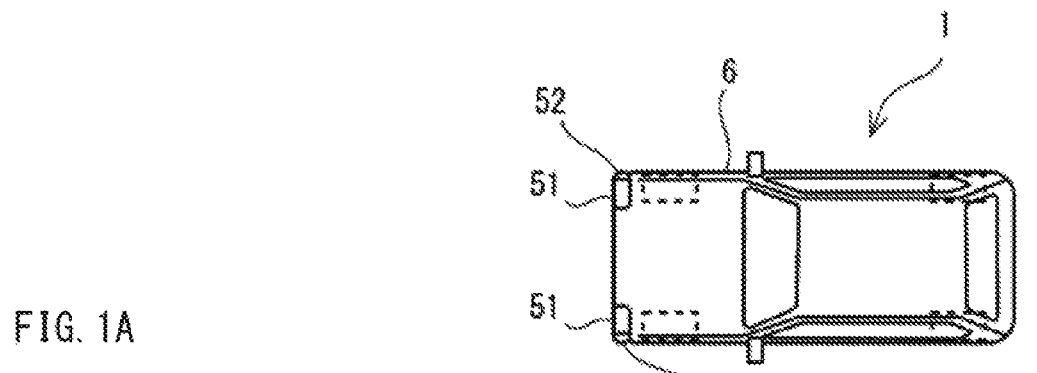
FIGS. 1A to 1C are schematic diagrams of an automated driving enabled automobile according to an embodiment of the technology.

The aims of automated driving enabled vehicles may possibly include making appropriate selection of a travel path, a safety check of a course, and an avoidance control of uncertainties, to travel to the destination without an unanticipated incident.

Executing such a control for safer travel, however, would not guarantee safety to 100% perfection. The possibility is that even such a travel control by automated driving enabled vehicles will provide only a limited level of safety.

For example, automated driving enabled vehicles may include an automated driving indicator lamp. Automated driving enabled vehicles may switch on the automated driving indicator lamp perceptibly from outside them, in a case where they are executing automated driving. Reference is made to, for example, Japanese Unexamined Patent Application Publication (JP-A) Nos. 2018-032433 and 2019-064471.

Such an automated driving enabled vehicle switching on the automated driving indicator lamp during the execution of the automated driving makes it possible for occupants of surrounding vehicles or nearby pedestrians to grasp the situation that the vehicle is executing the automated driving, allowing the occupants or the pedestrians to take an action or a prior countermeasure in response to the situation. The surrounding vehicles may be on a road or a lane on which the automated driving enabled vehicle is traveling.

As described, a travel control of automated driving enabled vehicles themselves provides only a limited level of safety in their travel environment. Automated driving enabled vehicles owe their enhanced safety to cooperation with surrounding vehicles and pedestrians.

Automated driving enabled vehicles may travel by the automated driving even in a parking lot and enter a parking section, or leave a parking section by the automated driving.

In a parking lot, vehicles may move forward, or turn right or left while moving forward. They may also move backward, or turn right or left while moving backward. Moreover, vehicles may move backward immediately after moving forward, or move backward to enter a parking section and then abruptly move forward in the course of the backward movement, in turning a steering wheel more than once, for example. In a parking lot, vehicles may often make irregular movements, unlike cases where they are traveling on a driveway.

In a case where the vehicle is executing the automated driving in a parking lot, it is difficult for those in the parking lot, e.g., surrounding vehicles and pedestrians, to predict movements of the vehicle in an attempt of parking and stopping by the automated driving in the parking lot. In the case of manual driving, those in the parking lot, e.g., surrounding vehicles and pedestrians, may sense an unusual situation, with the clue of a movement of, or an eye contact with the occupant of the vehicle in the parking attempt. In the case of the automated driving, however, it is difficult to avoid such a situation in such a way.

As described, automated driving enabled vehicles have had room for improvements.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

Figure 1B:
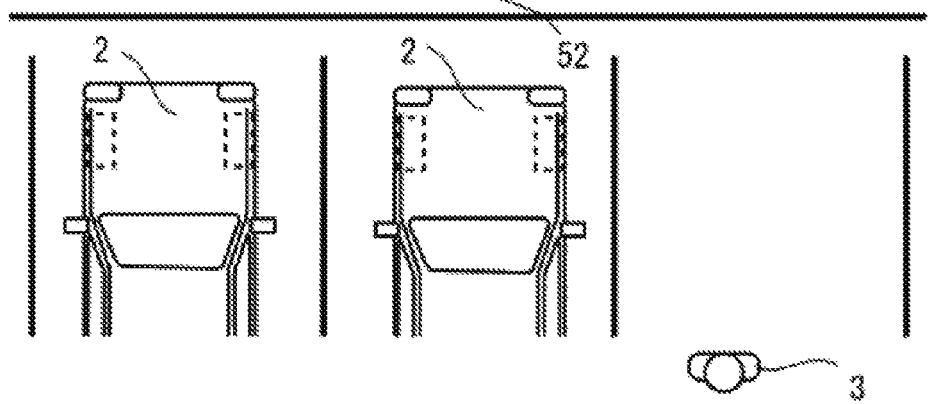
Figure 1B:
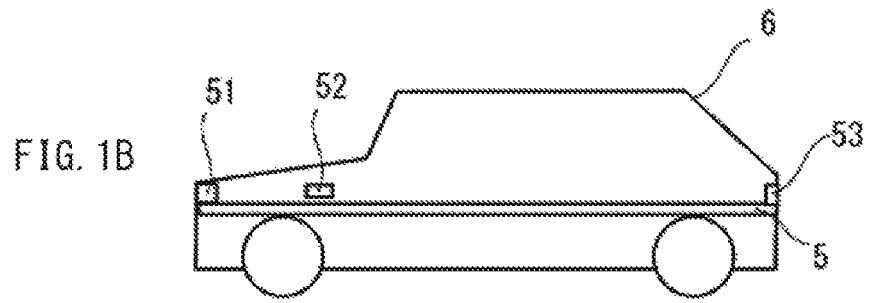
Figure 1C:
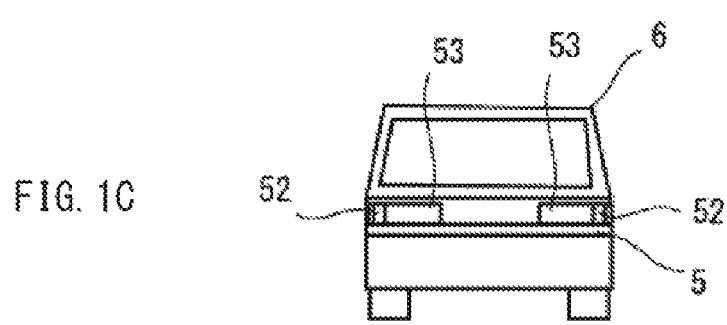

FIGS. 1A to 1C are schematic diagrams of an automated driving enabled automobile 1 according to an embodiment of the technology. In the following, the automated driving enabled automobile 1 is also simply referred to as an "automobile 1".

FIG. 1A is a top view of the automobile 1. In FIG. 1A, the automobile 1 is assumed to be traveling in a parking lot. FIG. 1A also illustrates surrounding automobiles 2 and a pedestrian 3. The surrounding automobiles 2 are parked in their respective parking sections of the parking lot. FIG. 1B is a side view of the automobile 1. FIG. 1C is a rear view of the automobile 1.

Referring to FIGS. 1A to 1C, the automobile 1 is configured to travel while switching between automated driving and manual driving. The automobile 1 includes an automated driving indicator lamp 5. The automated driving indicator lamp 5 is configured to be switched on, on the occasion of the automated driving.

The automated driving indicator lamp 5 may be a lamp that is switched on, to indicate that the automated driving is in execution. The automated driving indicator lamp 5 may circumscribe a vehicle body 6 of the automobile 1, for example, on all sides, i.e., front, rear, right and left sides, of the vehicle body 6. This makes it possible for those around the automobile 1, e.g., the pedestrian 3 and an occupant of the surrounding automobile 2, to visually recognize, from outside the automobile 1, illumination of the automated driving indicator lamp 5 on the occasion of the execution of the automated driving. Switching on the automated driving indicator lamp 5 on the occasion of the automated driving makes it possible to receive cooperation with the pedestrian 3 near the automobile 1 and the occupant of the surrounding automobile 2. Hence, it is possible to expect a higher level of safety than provided solely by a travel control of the automobile 1 itself.

The automated driving indicator lamp 5 may have other configurations than described above. For example, the automated driving indicator lamp 5 may be provided separately on four corners, i.e., front right, front left, rear right, and rear left corners, of the vehicle body 6. In one alternative, the automated driving indicator lamp 5 may be provided along an outer periphery of a roof panel over a vehicle cabin. In another alternative, the automated driving indicator lamp 5 may protrude from the roof panel.

The automated driving indicator lamp 5 is configured to be switched on, in a case where the automobile 1 is traveling by the automated driving. Moreover, it is desirable that presence or absence of the illumination of the automated driving indicator lamp 5 be perceptible to those outside the automobile 1, e.g., the pedestrian 3 and the occupant of the surrounding automobile 2, even in the summer daytime with strong sunlight around the automobile 1. Accordingly, the automated driving indicator lamp 5 may have a color or brightness that is rare in existence in the natural environment, e.g., turquoise blue. Moreover, the automated driving indicator lamp 5 may give illumination of a brighter color and higher brightness than anything in the natural environment. Strong illumination of turquoise blue light leads to higher possibility that the presence or the absence of the illumination of the automated driving indicator lamp 5 becomes more perceptible to those outside the automobile 1, e.g., the pedestrian 3 and the occupant of the surrounding automobile 2. This makes it possible for those outside the automobile 1, e.g., the pedestrian 3 and the occupant of the surrounding automobile 2, to take an action or a prior countermeasure in response to, for example, the automobile 1 executing the automated driving.

The automated driving enabled automobile 1 may travel by the automated driving even in a parking lot and enter a parking section, or leave a parking section by the automated driving.

In a parking lot, the automobile 1 may move forward, or turn right or left while moving forward. The automobile 1 may also move backward, or turn right or left while moving backward. Moreover, the automobile 1 may move backward immediately after moving forward, or move backward to enter a parking section and then abruptly move forward in the course of the backward movement, in turning a steering wheel more than once, for example. In a parking lot, the automobile 1 may often make irregular movements, unlike cases where the automobile 1 is traveling on a driveway.

In a case where the automobile 1 is executing the automated driving in a parking lot, it is difficult for those in the parking lot, e.g., the surrounding automobiles 2 and the pedestrian 3, to predict movements of the automobile 1 in an attempt of parking and stopping by the automated driving in the parking lot. In the case of the manual driving, those in the parking lot, e.g., the surrounding automobiles 2 and the pedestrian 3, may sense an unusual situation, a direction of the next movement of the automobile 1, or a direction of a detour to bypass the automobile 1, with the clue of a movement of, or an eye contact with the occupant of the automobile 1 in the parking attempt. In the case of the automated driving, however, it is difficult to avoid such a situation in such a way.

As described, the automated driving enabled automobile 1 has had room for improvements.

Figure 2:
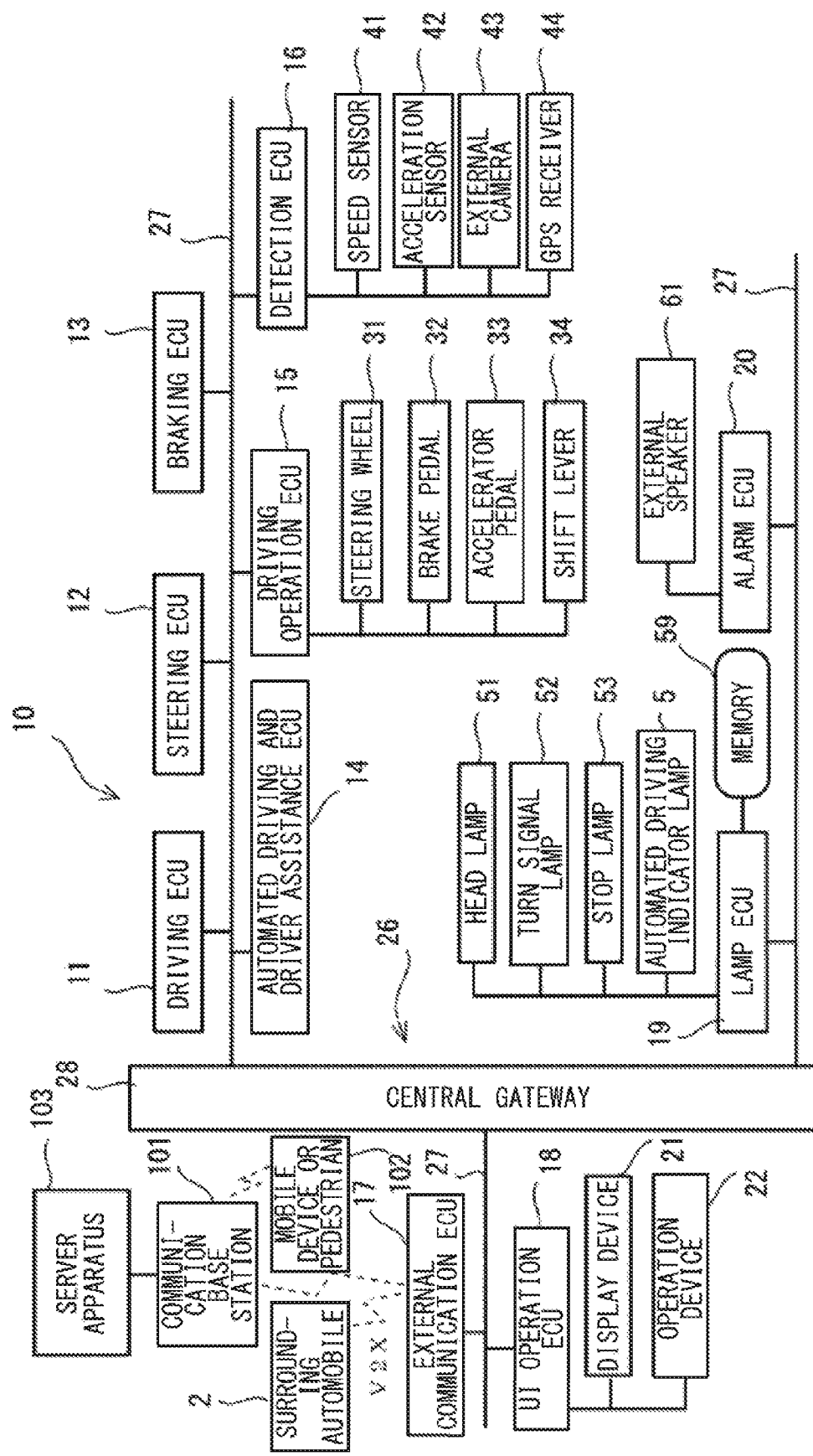
FIG. 2 is a block diagram of a control system of the automobile illustrated in FIGS. 1A to 1C.

FIG. 2 illustrates a control system 10 of the automobile 1 in FIGS. 1A to 1C. The control system 10 of the automobile 1 may include a plurality of controllers that are installed in their respective control ECUs (electronic control units). In FIG. 2, each of the plurality of the controllers is typically represented by a corresponding one of the control ECUs. Each of the plurality of the controllers may include not only the control ECU but also a storage member, input and output ports, a timer, and an internal bus to which the control ECU, the storage member, the input and output ports, and the timer are coupled. The storage member may hold, for example, a control program and data. The input and output ports may be coupled to an object to be controlled, and/or to a device that detects a state of the object to be controlled. The timer may measure time and timing.

As illustrated in FIG. 2, in one specific but non-limiting example, the control ECUs may include a driving ECU 11, a steering ECU 12, a braking ECU 13, an automated driving and driver assistance ECU 14, a driving operation ECU 15, a detection ECU 16, an external communication ECU 17, a UI operation ECU 18, a lamp ECU 19, and an alarm ECU 20. The control system 10 of the automobile 1 may further include other undepicted control ECUs.

The plurality of the control ECUs may be coupled to a vehicle network 26 adopted by the automobile 1 such as a CAN (controller area network) and a LIN (local interconnect network). The vehicle network 26 may include a plurality of bus cables 27 and a CGW (central gateway) 28. The plurality of the bus cables 27 is able to be coupled to the plurality of the control ECUs. The central gateway 28 may serve as a relay device to which the plurality of the bus cables 27 is coupled. To the plurality of the control ECUs, their respective IDs (identifications) may be assigned. The IDs may differ from one another and serve as identification information. Each of the control ECU may output, basically on a periodical basis, notification data to one or more of the other control ECUs. To the notification data, the ID of the sender control ECU and the ID of the receiver control ECU may be attached. The other control ECUs than the sender control ECU may monitor the respective ones of the bus cables 27 to which they are coupled. For example, in a case where any one of the other control ECUs finds the ID of the receiver control ECU to match its own ID, the relevant control ECU may acquire the notification data and execute processing based on the notification data. The central gateway 28 may monitor each of the plurality of the bus cables 27 coupled to the central gateway 28. In a case where the central gateway 28 detects one or more of the other control ECUs coupled to any one of the bus cables 27 different from the bus cable 27 to which the sender control ECU is coupled, the central gateway 28 may supply the notification data to the relevant one of the bus cables 27. With such relay processing by the central gateway 28, it is possible for each of the control ECUs to send the notification data to one or more of the other control ECUs coupled to respective ones of the bus cables 27 different from the bus cable 27 to which the sender control ECU is coupled. It is also possible for each of the control ECUs to receive the notification data from any one of the control ECUs coupled to the corresponding one of the bus cables 27 different from the bus cable 27 to which the receiver control ECU is coupled.

The external communication ECU 17 may perform wireless communication with, for example, a communication base station 101 and a communication device of the surrounding automobile 2. The communication base station 101 and the surrounding automobile 2 are present outside the automobile 1. The communication base station 101 may be, for example, a base station of an ADAS (advanced driver assistance system) communication network, or alternatively, the communication base station 101 may be, for example, a base station of a carrier communication network. The base station of the carrier communication network may communicate not only with the communication device of the surrounding automobile 2 but also with a mobile device 102 held by the pedestrian 3. The external communication ECU 17 may be divided into a plurality of subunits for respective categories of partners with whom the external communication ECU 17 communicates directly, and the subunits may be provided in the automobile 1. The communication base station 101, the communication device of the surrounding automobile 2, and the mobile device 102, together with a server apparatus 103, may constitute a traffic system 100. The external communication ECU 17 may transmit and receive communication data to and from the server apparatus 103, the surrounding automobile 2, or the mobile device 102 by directly performing wireless communication with the communication base station 101 or the communication device of the surrounding automobile 2.

To the UI operation ECU 18, a display device 21 and an operation device 22 may be coupled as, for example, a user interface device with an occupant of the automobile 1. The display device 21 may include, for example, a liquid crystal device or a video projection device, or both. The operation device 22 may be, for example, a touchscreen, a keyboard, or a contactless operation sensing device, or any combination thereof. The display device 21 and the operation device 22 may be mounted on, for example, an inner surface of the vehicle cabin in which the occupant rides. The UI operation ECU 18 may acquire the notification data from the vehicle network 26, and display the notification data on the display device 21. The UI operation ECU 18 may output, to the vehicle network 26, an operation input made on the operation device 22. Moreover, the UI operation ECU 18 may perform processing based on the operation input and incorporate a result of the processing in the notification data. The UI operation ECU 18 may provide, for example, display of a navigation screen on the display screen 21. The navigation screen may allow for setting of, for example, a destination. The UI operation ECU 18 may search a path to the destination selected by the operation input. The UI operation ECU 18 may incorporate data regarding the path in the notification data. The data regarding the path may include attribute information regarding, for example, lanes of roads to be used to move from a current position to the destination.

To the driving operation ECU 15, coupled may be operation members that allow the occupant to control the travel of the automobile 1. Specific but non-limiting examples of the operation members may include a steering wheel 31, a brake pedal 32, an accelerator pedal 33, and a shift lever 34. If any operation is made on the operation members, the driving operation ECU 15 may output, to the vehicle network 26, the notification data including, for example, presence or absence of the operation and an amount of the operation. Moreover, the driving operation ECU 15 may execute processing regarding the operation on the operation members, and incorporate a result of the processing in the notification data. For example, if any operation is made on the accelerator pedal 33, with presence of surrounding moving bodies and/or fixed objects in a traveling direction of the automobile 1, the driving operation ECU 15 may make a determination that the operation on the accelerator pedal 33 is an abnormal operation. The driving operation ECU 15 may incorporate the result of the determination in the notification data.

To the detection ECU 16, coupled may be detection members that detect a travel state of the automobile 1. Specific but non-limiting examples of the detection members may include a speed sensor 41, an acceleration sensor 42, an external camera 43, and a GPS receiver 44. The speed sensor 41 may detect a speed of the automobile 1. The acceleration sensor 42 may detect an acceleration rate of the automobile 1. The external camera 43 may capture an image of external surroundings of the automobile 1, and include, for example, a stereo camera. The GPS receiver 44 may serve as a GNSS (global navigation satellite system) receiver that detects a position of the automobile 1. The detection ECU 16 may acquire detection information from the detection members. The detection ECU 16 may output the notification data including the detection information to the vehicle network 26. Furthermore, the detection ECU 16 may execute processing based on the detection information and incorporate a result of the processing in the notification data. For example, in a case where the acceleration sensor 42 detects the acceleration rate being higher than a threshold of detection of a collision, the detection ECU 16 may make a determination that a collision has been detected. The detection ECU 16 may incorporate the result of the determination in the notification data. The detection ECU 16 may extract a moving body such as the pedestrian 3 or the surrounding automobile 2 that are present around the automobile 1, on the basis of the image of the external camera 43. The detection ECU 16 may determine a kind and attributes of the moving body, and make estimation of a relative direction, a relative distance, and a direction of movement of the moving body in accordance with a position, a size, and a change of the moving body in the image. The detection ECU 16 may incorporate information regarding the moving body including a result of the estimation in the notification data and output the notification data to the vehicle network 26.

The automated driving and driver assistance ECU 14 may acquire the notification data from the vehicle network 26 and switch a travel control state of the automobile 1 between the automated driving and the manual driving.

Moreover, the automated driving and driver assistance ECU 14 may acquire the notification data from the vehicle network 26, execute a control for the automated driving or driver assistance of the automobile 1, and generate travel control data to output the travel control data to the driving ECU 11, the steering ECU 12, and the braking ECU 13. The driving ECU 11, the steering ECU 12, and the braking ECU 13 may control the travel of the automobile 1 on the basis of the travel control data to be supplied.

In one embodiment of the technology, the automated driving and driver assistance ECU 14 may serve as a "travel controller".

In one specific but non-limiting example, in performing the automated driving of the automobile 1, the automated driving and driver assistance ECU 14 may acquire the notification data from the vehicle network 26 and search or acquire the path to the destination. The automated driving and driver assistance ECU 14 may acquire the notification data from the vehicle network 26, determine presence or absence of an abnormality or uncertainties in the automobile 1. In a case without any abnormality or uncertainties in the automobile 1, the automated driving and driver assistance ECU 14 may generate the travel control data regarding a course to be traveled along the path, and output the generated travel control data as the notification data. The automated driving and driver assistance ECU 14 may control the travel of the automobile 1 on the basis of positional information of the automobile 1 from, for example, the GPS receiver 44, to allow the automobile 1 to travel along the path of its movement until an arrival at the destination, i.e., until the automobile 1 stops, for example, in a parking lot at the destination. In a case with an abnormality or uncertainties with respect to the automobile 1, the automated driving and driver assistance ECU 14 may generate the travel control data to avoid the abnormality or the uncertainties, and output the generated travel control data as the notification data.

In assisting with driving of the automobile 1, the automated driving and driver assistance ECU 14 may acquire the notification data regarding the operation input from the UI operation ECU 18 through the vehicle network 26. The automated driving and driver assistance ECU 14 may generate the travel control data in which an operation based on the operation input is adjusted, and output the travel control data as the notification data. The automated driving and driver assistance ECU 14 may control the travel of the automobile 1 in accordance with a driving operation by the occupant. In a case with an abnormality or uncertainties with respect to the automobile 1, the automated driving and driver assistance ECU 14 may generate the travel control data to avoid the abnormality or the uncertainties, and output the generated travel control data as the notification data.

To the lamp ECU 19, coupled may be head lamps 51, turn signal lamps 52, stop lamps 53, and the automated driving indicator lamp 5. The head lamps 51 may be provided in a front part of the vehicle body 6 of the automobile 1. The turn signal lamps 52 may be provided on front right, front rear, rear right, and rear left corners of the vehicle body 6. The stop lamps 53 may be provided in a rear part of the vehicle body 6. Moreover, as illustrated in the figure, a memory 59 may be coupled to the lamp ECU 19. The memory 59 coupled to the lamp ECU 19 may hold setting values the lamp ECU 19 uses for a control.

In one embodiment of the technology, the lamp ECU 19 may serve as a "lamp controller".

In one specific but non-limiting example, the lamp ECU 19 may acquire, from the vehicle network 26, the notification data for a lamp control. In accordance with the notification data acquired, the lamp ECU 19 may control lighting states of the head lamps 51, the turn signal lamps 52, the stop lamps 53, and the automated driving indicator lamp 5. For example, in a case where the automated driving and driver assistance ECU 14 is controlling the travel of the automobile 1 by the automated driving, the lamp ECU 19 may switch on the automated driving indicator lamp 5 during the execution of the automated driving. This makes it possible for the moving body outside the automobile 1, e.g., the pedestrian 3 and the surrounding automobile 2, to visually recognize, with the clue of the illumination of the automated driving indicator lamp 5, that the automobile 1 is executing the automated driving. Hence, it is possible for the moving body outside the automobile 1, e.g., the pedestrian 3 and the surrounding automobile 2, to cope with the travel of the automobile 1 executing the automated driving. The lamp ECU 19 may perform a lighting control to switch off the automated driving indicator lamp 5, in a case where, for example, travel environment of the automobile 1 renders it unnecessary to switch on the automated driving indicator lamp 5 regardless of the execution of the automated driving.

To the alarm ECU 20, an external speaker 61 may be coupled. The alarm ECU 20 may acquire the notification data regarding an alarm output from the vehicle network 26 and output an alarm sound from the external speaker 61 in response to the notification data thus acquired.

Figure 3:
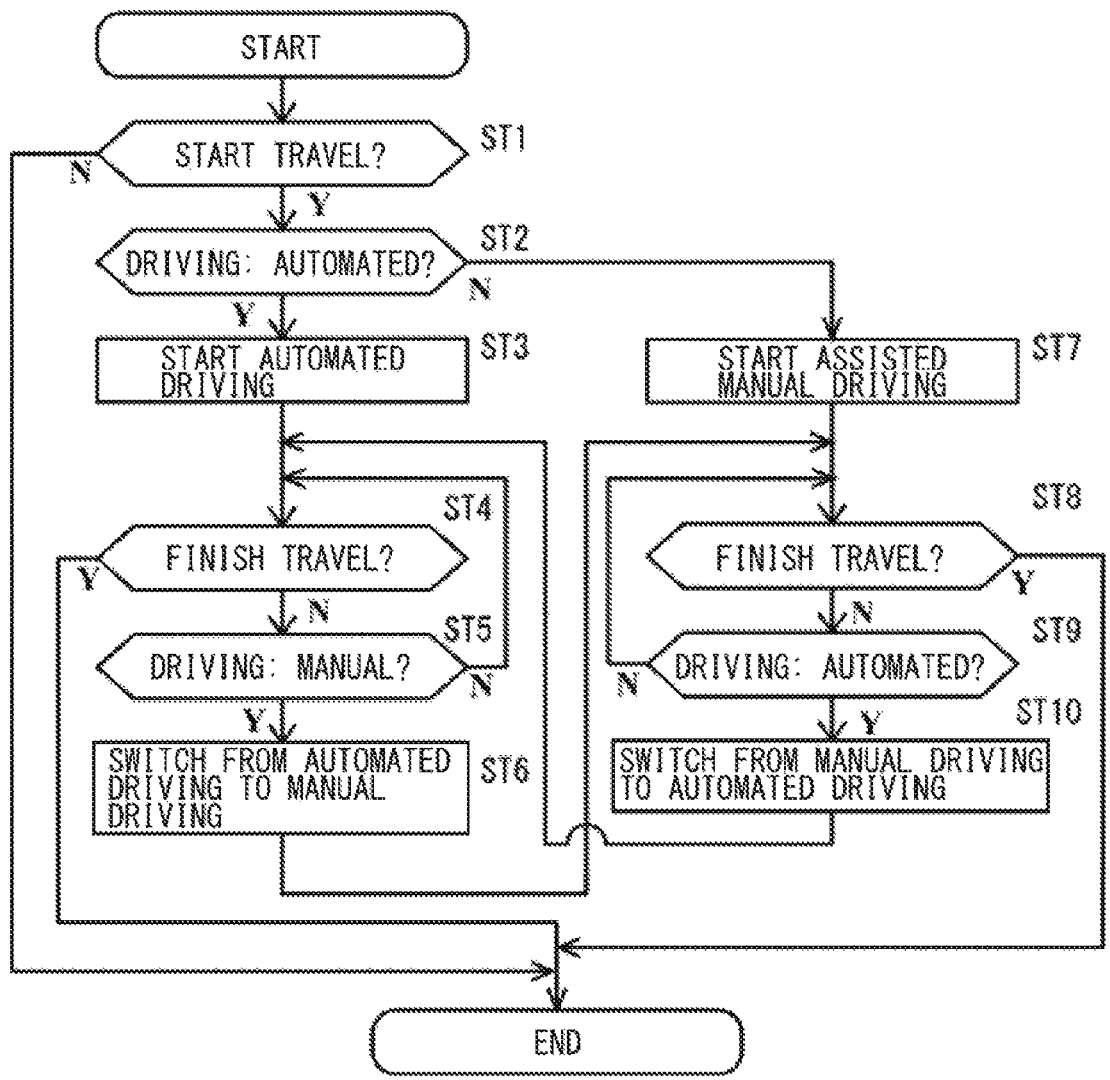
FIG. 3 is a flowchart of a switching control between automated driving and assisted manual driving.

FIG. 3 is a flowchart of a switching control between the automated driving and assisted manual driving. The automated driving and driver assistance ECU 14 may repeatedly execute processing of FIG. 3 in a case where, for example, the occupant rides in the automobile 1.

In step ST1, the automated driving and driver assistance ECU 14 may determine whether or not to start the travel of the automobile 1. In a case where the travel of the automobile 1 is not going to be started (N in step ST1), the automated driving and driver assistance ECU 14 may terminate the processing of FIG. 3. In a case where the travel of the automobile 1 is going to be started (Y in step ST1), the automated driving and driver assistance ECU 14 may cause the processing to proceed to step ST2.

In step ST2, the automated driving and driver assistance ECU 14 may determine whether or not the travel of the automobile 1 is controlled by the automated driving. The automated driving and driver assistance ECU 14 may determine whether or not the travel of the automobile 1 is controlled by the automated driving on the basis of, for example, a setting value of a driving mode acquired from the UI operation ECU 18. In a case where the travel of the automobile 1 is controlled by the automated driving (Y in step ST2), the automated driving and driver assistance ECU 14 may cause the processing to proceed to step ST3. In a case where the travel of the automobile 1 is not controlled by the automated driving but is otherwise controlled, e.g., by the assisted manual driving (N in step ST2), the automated driving and driver assistance ECU 14 may cause the processing to proceed to step ST7.

In step ST3, the automated driving and driver assistance ECU 14 may start the travel by the automated driving. The automated driving and driver assistance ECU 14 may control the travel of the automobile 1 by the automated driving.

In step ST4, the automated driving and driver assistance ECU 14 may determine whether or not to finish the travel of the automobile 1. The automated driving and driver assistance ECU 14 may determine that the travel of the automobile 1 is going to be finished, in a case where the positional information of the automobile 1 indicates that the automobile 1 is stopped, for example, in a parking lot at the destination of the automated driving, with the acceleration rate being zero (0). The positional information of the automobile 1 may be acquired from the external communication ECU 17 or the GPS receiver 44. In a case where the automated driving and driver assistance ECU 14 determines that the travel of the automobile 1 is going to be finished (Y in step ST4), the automated driving and driver assistance ECU 14 may terminate the processing of FIG. 3. Thus, the travel by the automated driving is finished. In a case where the automated driving and driver assistance ECU 14 does not determine that the travel of the automobile 1 is going to be finished (N in step ST4), the automated driving and driver assistance ECU 14 may cause the processing to proceed to step ST5.

In step ST5, the automated driving and driver assistance ECU 14 may determine whether or not to switch the travel of the automobile 1 from the automated driving to otherwise than the automated driving, e.g., the manual driving. The automated driving and driver assistance ECU 14 may determine that the travel of the automobile 1 is going to be switched from the automated driving, on the basis of, for example, the setting value of the driving mode acquired from the UI operation ECU 18. In a case where the travel of the automobile 1 is not going to be switched from the automated driving to otherwise than the automated driving (N in step ST5), the automated driving and driver assistance ECU 14 may cause the processing to return to step ST4. The automated driving and driver assistance ECU 14 may repeat the determinations of steps ST4 and ST5 while the automated driving is in execution. In a case where the travel of the automobile 1 is going to be switched from the automated driving to otherwise than the automated driving (Y in step ST5), the automated driving and driver assistance ECU 14 may cause the processing to proceed to step ST6.

In step ST6, the automated driving and driver assistance ECU 14 may switch the travel of the automobile 1 from the automated driving to otherwise than the automated driving, e.g., the assisted manual driving. Thus, the travel by the automated driving is finished, and the travel by the manual driving is started. Thereafter, the automated driving and driver assistance ECU 14 may cause the processing to proceed to step ST8.

In step ST7, the automated driving and driver assistance ECU 14 may start the assisted manual driving or otherwise than the automated driving.

In step ST8, the automated driving and driver assistance ECU 14 may determine whether or not to finish the travel of the automobile 1. For example, the automated driving and driver assistance ECU 14 may determine that the travel of the automobile 1 is going to be finished, in a case where the automobile 1 is stopped, with the acceleration rate being zero (0), and an operation is made on an ignition switch of the automobile 1. In a case with a determination that the travel of the automobile 1 is going to be finished (Y in step ST8), the automated driving and driver assistance ECU 14 may terminate the processing of FIG. 3. Thus, the travel by the assisted manual driving is finished. In a case without the determination that the travel of the automobile 1 is going to be finished (N in step ST8), the automated driving and driver assistance ECU 14 may cause the processing to proceed to step ST9.

In step ST9, the automated driving and driver assistance ECU 14 may determine whether or not to switch the travel of the automobile 1 from the assisted manual driving to the automated driving. The automated driving and driver assistance ECU 14 may determine that the travel of the automobile 1 is going to be switched from the assisted manual driving, on the basis of, for example, the setting value of the driving mode acquired from the UI operation ECU 18. In a case where the travel of the automobile 1 is not going to be switched from the assisted manual driving to the automated driving (N in step ST9), the automated driving and driver assistance ECU 14 may cause the processing to return to step ST8. The automated driving and driver assistance ECU 14 may repeat the determinations of steps ST8 and ST9 while the assisted manual driving is in execution. In a case where the travel of the automobile 1 is going to be switched from the assisted manual driving to the automated driving (Y in step ST9), the automated driving and driver assistance ECU 14 may cause the processing to proceed to step ST10.

In step ST10, the automated driving and driver assistance ECU 14 may switch the travel of the automobile 1 from the assisted manual driving to the automated driving. Thus, the travel by the assisted manual driving is finished, and the travel by the automated driving is started. Thereafter, the automated driving and driver assistance ECU 14 may cause the processing to proceed to step ST4.

As described, the automated driving and driver assistance ECU 14 may repeatedly execute the processing of FIG. 3, in a case where, for example, the automobile 1 is traveling, with the occupant riding therein. For example, the automated driving and driver assistance ECU 14 may acquire, through the vehicle network 26, the notification data inclusive of setting information of the driving mode from the UI operation ECU 18, and switch the travel of the automobile 1 between the automated driving and the assisted manual driving. Moreover, the automated driving and driver assistance ECU 14 may acquire the notification data inclusive of an instruction to compulsively switch to the manual driving, and switch the travel of the automobile 1 between the automated driving and the assisted manual driving. Such an instruction may be based on, for example, detection of an abnormality from the detection ECU 16. Furthermore, the automated driving and driver assistance ECU 14 itself may generate the notification data inclusive of the instruction based on the detection of an abnormality, to compulsively switch to the manual driving, and switch the travel of the automobile 1 between the automated driving and the assisted manual driving.

Figure 4:
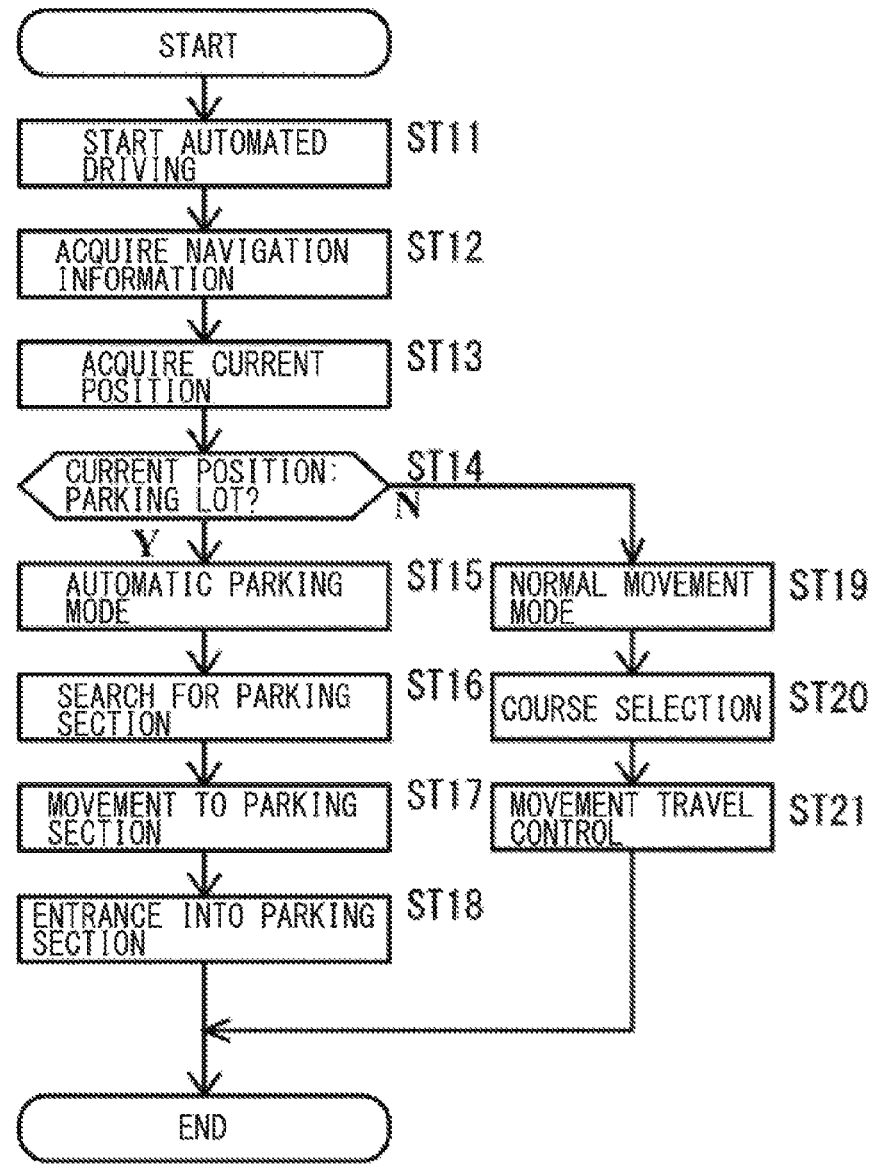
FIG. 4 is a flowchart of a travel control of the automobile by the automated driving.

FIG. 4 is a flowchart of a travel control of the automobile 1 by the automated driving.

The automated driving and driver assistance ECU 14 may repeatedly execute processing of FIG. 4, while controlling the travel of the automobile 1 by the automated driving.

In the automated driving, the automated driving and driver assistance ECU 14 is configured to control the travel of the automobile 1 in a normal movement mode and in an automatic parking mode. The normal movement mode includes allowing the automobile 1 to travel normally on, for example, a road. The automatic parking mode includes parking and stopping the automobile 1 in a parking lot.

In parking and stopping the automobile 1 in a parking lot, the automated driving and driver assistance ECU 14 may sometimes allow the automobile 1 to make small movements quickly and repetitively, forward and backward, rightward and leftward, unlike normal travel. Moreover, each of parking sections of a parking lot where the automobile 1 is parked is a size larger than outlines of the automobile 1. In some cases, the automobile 1 is supposed to ensure a space where the occupant can get in or out of the automobile 1, between the automobile 1 parked and the surrounding automobiles 2 parked next to the automobile 1. This is one reason the automated driving and driver assistance ECU 14 allows the automobile 1 to make the small movements quickly and repetitively, forward and backward, rightward and leftward. Furthermore, in a parking lot, the possibility is high that a course of the pedestrian 3 who moves in the parking lot crosses a course of the automobile 1. Thus, the automated driving and driver assistance ECU 14 has the automatic parking mode specialized in a control in a parking lot, separately from the normal movement mode.

In step ST11, the automated driving and driver assistance ECU 14 may start the automated driving.

In step ST12, the automated driving and driver assistance ECU 14 may acquire navigation information, to allow the automobile 1 to travel by the automated driving. The navigation information may include, for example, the destination and the path of the automobile 1. The automated driving and driver assistance ECU 14 may acquire the navigation information from, for example, the UI operation ECU 18 or the external communication ECU 17.

In step ST13, the automated driving and driver assistance ECU 14 may acquire the current position of the automobile 1. As the current position of the automobile 1, the automated driving and driver assistance ECU 14 may acquire, for example, the position of the automobile 1 detected by the GPS receiver 44 and outputted from the detection ECU 16.

In step ST14, the automated driving and driver assistance ECU 14 may determine whether or not the current position of the automobile 1 is located in a parking lot. For example, in a case where the destination in the navigation information is a parking lot of facilities, and the movement to the destination has been finished, the automated driving and driver assistance ECU 14 may determine that the current position of the automobile 1 is located in a parking lot (Y in step ST14), and cause the processing to proceed to step ST15. For example, in a case where the destination in the navigation information is a parking lot of facilities, but the current position of the automobile 1 is away from the parking lot, the automated driving and driver assistance ECU 14 may determine that the current position of the automobile 1 is located otherwise than in a parking lot (N in step ST14), and cause the processing to proceed to step ST19.

In step ST15, the automated driving and driver assistance ECU 14 may start the travel control of the automobile 1 in the automatic parking mode. The automatic parking mode includes parking and stopping the automobile 1 in a parking lot.

In step ST16 in the automatic parking mode, first, the automated driving and driver assistance ECU 14 may search for a parking section available for parking. The automated driving and driver assistance ECU 14 may acquire information regarding parking sections of the parking lot by, for example, the external communication ECU 17.

In step ST17, the automated driving and driver assistance ECU 14 may start slow-speed travel in the parking lot, to move the automobile 1 to directly in front of a vacant parking section available for parking. The automated driving and driver assistance ECU 14 may check, by the image captured by the external camera 43, if the parking section is vacant and available for parking. The automated driving and driver assistance ECU 14 may stop the automobile 1 directly in front of the vacant parking section available for parking.

In step ST18, the automated driving and driver assistance ECU 14 may execute an entrance travel control. The entrance travel control includes parking the automobile 1 in the vacant parking section. Thus, the automobile 1 is stopped and parked in the parking section of the parking lot as the destination.

In step ST19, the automated driving and driver assistance ECU 14 may start the travel control of the automobile 1 in the normal movement mode. The normal movement mode includes allowing the automobile 1 to move to the destination.

In step ST20 in the normal movement mode, first, the automated driving and driver assistance ECU 14 may acquire information for the travel of the automobile 1, to select a course. The automated driving and driver assistance ECU 14 may select a course along which the automobile 1 is going to move along a movement path, from the current position on the movement path to the destination.

In step ST21, the automated driving and driver assistance ECU 14 may execute a movement travel control. The movement travel control includes allowing the automobile 1 to travel along the selected course.

As described, the automated driving and driver assistance ECU 14 is configured to acquire the positional information regarding the automobile 1 to determine whether or not the automobile 1 is located in the parking lot. In the case where the automobile 1 is located in the parking lot, the automated driving and driver assistance ECU 14 is configured to control the automobile 1 in the automatic parking mode. In the case where the automobile 1 is located otherwise than in the parking lot, the automated driving and driver assistance ECU 14 is configured to control the automobile 1 in the normal movement mode.

Figure 5:
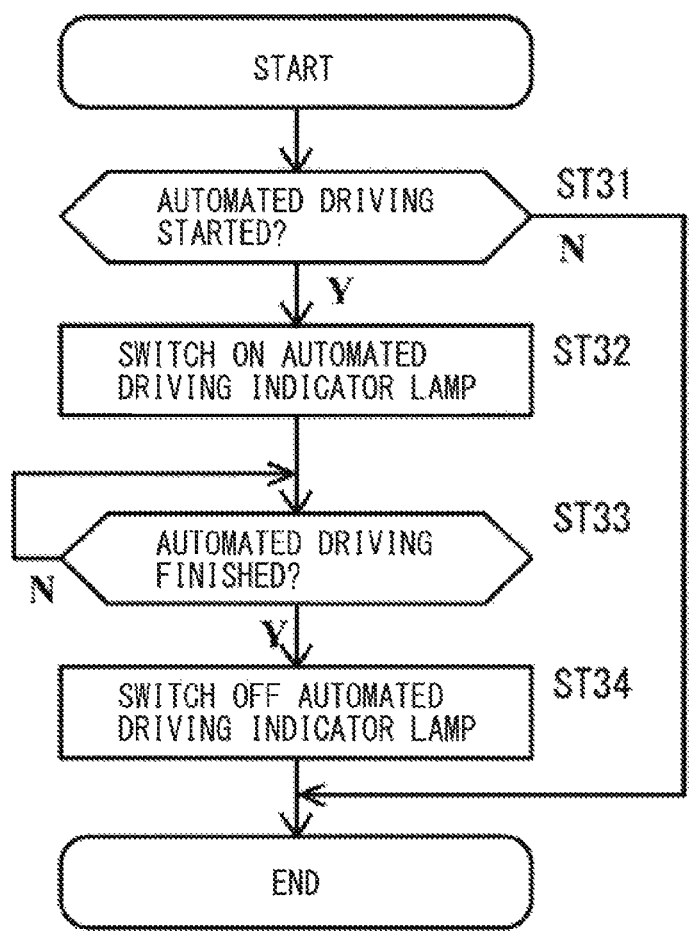
FIG. 5 is a flowchart of a lighting control of an automated driving indicator lamp in accordance with the switching control between the automated driving and the assisted manual driving illustrated in FIG. 3.

FIG. 5 is a flowchart of the lighting control of the automated driving indicator lamp 5 in accordance with the switching control between the automated driving and the assisted manual driving illustrated in FIG. 3.

The lamp ECU 19 may repeatedly execute processing of FIG. 5, while keeping on acquiring, as the notification data, information from the automated driving and driver assistance ECU 14 controlling the travel of the automobile 1.

In step ST31, the lamp ECU 19 may determine whether or not the travel of the automobile 1 by the automated driving has been started. The lamp ECU 19 may acquire, for example, information and/or notification the automated driving and driver assistance ECU 14 outputs to the vehicle network 26 for a control of the automated driving, and determine whether or not the travel of the automobile 1 by the automated driving has been started. In a case where the travel of the automobile 1 by the automated driving has not been started (N in step ST31), the lamp ECU 19 may terminate the processing of FIG. 5. In a case where the travel of the automobile 1 by the automated driving has been started (Y in step ST31), the lamp ECU 19 may cause the processing to proceed to step ST32.

In step ST32, the lamp ECU 19 may switch on the automated driving indicator lamp 5 that has been off.

In step ST33, the lamp ECU 19 may determine whether or not the travel of the automobile 1 by the automated driving has been finished. For example, the lamp ECU 19 may determine whether or not the travel of the automobile 1 by the automated driving has been finished, on the basis of an end of acquisition of the information supplied to the vehicle network 26 from the automated driving and driver assistance ECU 14 for the control of the automated driving. Alternatively, the lamp ECU 19 may determine whether or not the travel of the automobile 1 by the automated driving has been finished, by acquiring notification that the automated driving has been finished. In a case where the travel of the automobile 1 by the automated driving has not been finished (N in step ST33), the lamp ECU 19 may repeat the determination process of step ST33. In a case where the travel of the automobile 1 by the automated driving has been finished (Y in step ST33), the lamp ECU 19 may cause the processing to proceed to step ST34.

In step ST34, the lamp ECU 19 may switch off the automated driving indicator lamp 5 that has been switched on.

As described, the lamp ECU 19 may basically switch on the automated driving indicator lamp 5 during the execution of the automated driving in which the automated driving and driver assistance ECU 14 controls the travel of the automobile 1 by the automated driving.

Figure 6:
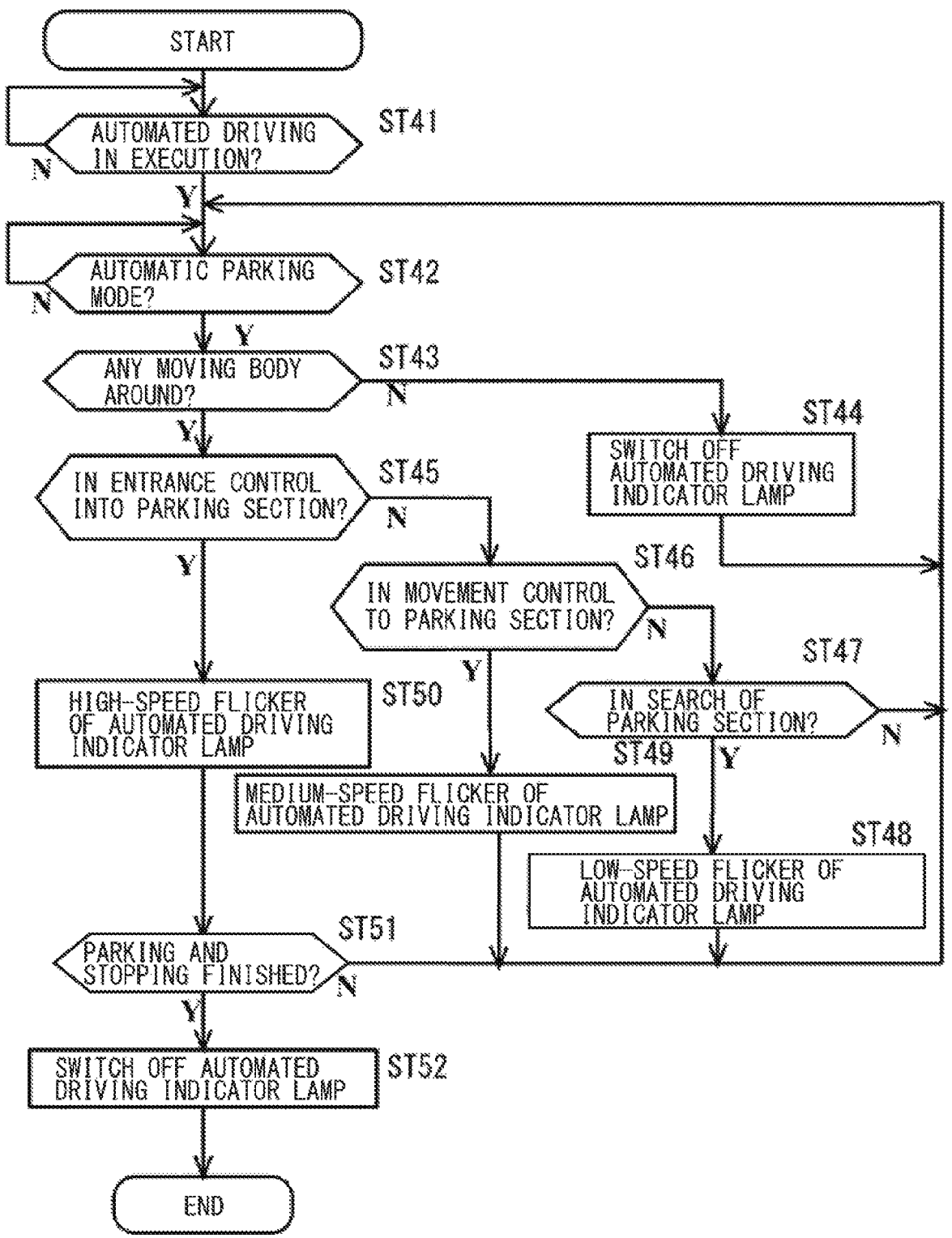
FIG. 6 is a flowchart of a lighting state control of the automated driving indicator lamp in a case where the automobile is parked in a parking section of a parking lot in an automatic parking mode.

FIG. 6 is a flowchart of a lighting state control of the automated driving indicator lamp 5, in a case where the automobile 1 is parked in the parking section of the parking lot in the automatic parking mode.

The lamp ECU 19 may repeatedly execute processing of FIG. 6, while keeping on acquiring the notification data from the automated driving and driver assistance ECU 14 controlling the travel of the automobile 1 by, for example, the automated driving.

In one embodiment of the technology, the lamp ECU 19 may serve as the "lamp controller".

In step ST41, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST41), the lamp ECU 19 may repeat the determination process of step ST41. In a case where the automated driving is in execution (Y in step ST41), the lamp ECU 19 may cause the processing to proceed to step ST42.

In step ST42, the lamp ECU 19 may determine whether or not the automated driving and driver assistance ECU 14 is controlling the travel of the automobile 1 in the automatic parking mode. In a case where the automated driving and driver assistance ECU 14 is not controlling the travel of the automobile 1 in the automatic parking mode (N in step ST42), the lamp ECU 19 may repeat the determination process of step ST42. In a case where the automated driving and driver assistance ECU 14 is controlling the travel of the automobile 1 in the automatic parking mode (Y in step ST42), the lamp ECU 19 may cause the processing to proceed to step ST43.

In step ST43, the lamp ECU 19 may determine presence or absence of any surrounding moving body around the automobile 1 travel of which by the automated driving is being controlled in the automatic parking mode. Non-limiting examples of the surrounding moving body may include the surrounding automobile 2 and pedestrians. The lamp ECU 19 may determine the presence or the absence of any surrounding moving body around the automobile 1, on the basis of presence or absence of any surrounding moving body extracted from the image captured by the external camera 43. In a case with the absence of any surrounding moving body around the automobile 1 (N in step ST43), the lamp ECU 19 may cause the processing to proceed to step ST44. In a case with the presence of some surrounding moving body around the automobile 1 (Y in step ST43), the lamp ECU 19 may cause the processing to proceed to step ST45.

In step ST44, the lamp ECU 19 may switch off the automated driving indicator lamp 5. Thereafter, the lamp ECU 19 may cause the processing to return to step ST42. In the case with the absence of any surrounding moving body around the automobile 1, with the travel of the automobile 1 by the automated driving being controlled in the automatic parking mode, the lamp ECU 19 may repeat the processes of steps ST42 to ST44, to keep the automated driving indicator lamp 5 off.

Meanwhile, in the case with the presence of some surrounding moving body around the automobile 1, with the travel of the automobile 1 by the automated driving being controlled in the automatic parking mode, the lamp ECU 19 may execute the process of step ST45 and subsequent processes, to switch on the automated driving indicator lamp 5.

In step ST45, the lamp ECU 19 may determine whether or not the automobile 1 is in an entrance control into the parking section. In a case where the automated driving and driver assistance ECU 14 is executing the process of step ST18 in the automatic parking mode, the lamp ECU 19 may determine that the automobile 1 is in the entrance control into the parking section (Y in step ST45), and cause the processing to proceed to step ST50. In a case where the automobile 1 is not in the entrance control into the parking section (N in step ST45), the lamp ECU 19 may cause the processing to proceed to step ST46.

In step ST46, the lamp ECU 19 may determine whether or not the automobile 1 is in a movement control to the parking section. In a case where the automated driving and driver assistance ECU 14 is executing the process of step ST17 in the automatic parking mode, the lamp ECU 19 may determine that the automobile 1 is in the movement control to the parking section (Y in step ST46), and cause the processing to proceed to step ST49. In a case where automobile 1 is not in the movement control to the parking section (N in step ST46), the lamp ECU 19 may cause the processing to proceed to step ST47.

In step ST47, the lamp ECU 19 may determine whether or not the automobile 1 is in search of the parking section available for parking. In a case where the automated driving and driver assistance ECU 14 is executing the process of step ST16 in the automatic parking mode, the lamp ECU 19 may determine that the automobile 1 is in search of the parking section (Y in step ST47), and cause the processing to proceed to step ST48. In a case where the automobile 1 is not in search of the parking section (N in step ST47), the lamp ECU 19 may cause the processing to return to step ST42.

In step ST48, the lamp ECU 19 may cause low-speed flicker of the automated driving indicator lamp 5. The lamp ECU 19 is configured to control the lighting state of the automated driving indicator lamp 5 during the execution of the automated driving to a first lighting state, e.g., continuous illumination, in the normal movement mode, and to a second lighting state different from the first lighting state, e.g., flicker, in the automatic parking mode. Thereafter, the lamp ECU 19 may cause the processing to return to step ST42.

In step ST49, the lamp ECU 19 may cause medium-speed flicker of the automated driving indicator lamp 5. The automated driving indicator lamp 5 flickers on shorter cycles than in the case of step ST48. Thereafter, the lamp ECU 19 may cause the processing to return to step ST42.

In step ST50, the lamp ECU 19 may cause high-speed flicker of the automated driving indicator lamp 5. The automated driving indicator lamp 5 flickers on shorter cycles than in the case of step ST49. Thereafter, the lamp ECU 19 may cause the processing to proceed to step ST51.

In step ST51, the lamp ECU 19 may determine whether or not the automobile 1 has entered the parking section available for parking, and the parking and stopping has been finished. In a case where the automated driving and driver assistance ECU 14 has finished the process of step ST18, the lamp ECU 19 may determine that the parking and stopping has been finished (Y in step ST51), and cause the processing to proceed to step ST52. In a case where the parking and stopping has not been finished (N in step ST51), the lamp ECU 19 may cause the processing to return to step ST42. In this way, the lamp ECU 19 may repeat the processes of steps ST42 to ST50 until the parking and stopping has been finished. In the meanwhile, the lighting state of the automated driving indicator lamp 5 may be switched between the low-speed flicker, the medium-speed flicker, and the high-speed flicker, depending on what phase of the processing of the parking and stopping by the automated driving and driver assistance ECU 14 is occurring at the time. Basically, the lighting state of the automated driving indicator lamp 5 may be switched between the low-speed flicker in an initial phase in search of the parking section of the parking lot, the medium-speed flicker in a phase of the movement to directly in front of the parking section, and the high-speed flicker in a phase of the entrance into the parking section.

In step ST52, the lamp ECU 19 may switch off the automated driving indicator lamp 5. Thus, the automated driving indicator lamp 5 of the automobile 1 that has entered the parking section is off while the automobile 1 is parked and stopped.

As described, the automated driving and driver assistance ECU 14 is configured to control the travel of the automobile 1 by the automated driving in the normal movement mode and in the automatic parking mode. The normal movement mode includes allowing the automobile 1 to travel, and the automatic parking mode includes parking the automobile 1 by the automated driving in the parking lot. The lamp ECU 19 is configured to control the lighting state of the automated driving indicator lamp 5 during the execution of the automated driving to the first lighting state in the normal movement mode, and to the second lighting state different from the first lighting state in the automatic parking mode.

In the automatic parking mode on the occasion of the entrance into the parking section of the parking lot, the lamp ECU 19 may switch the lighting state of the automated driving indicator lamp 5, between in search of the parking section of the parking lot, in the movement control to the parking section spotted, and in the entrance control into the parking section.

In one alternative, in the automatic parking mode on the occasion of the entrance into the parking section of the parking lot, the lamp ECU 19 may switch the lighting state of the automated driving indicator lamp 5, between in the movement control to the spotted parking section of the parking lot, and in the entrance control into the parking section.

Figure 7:
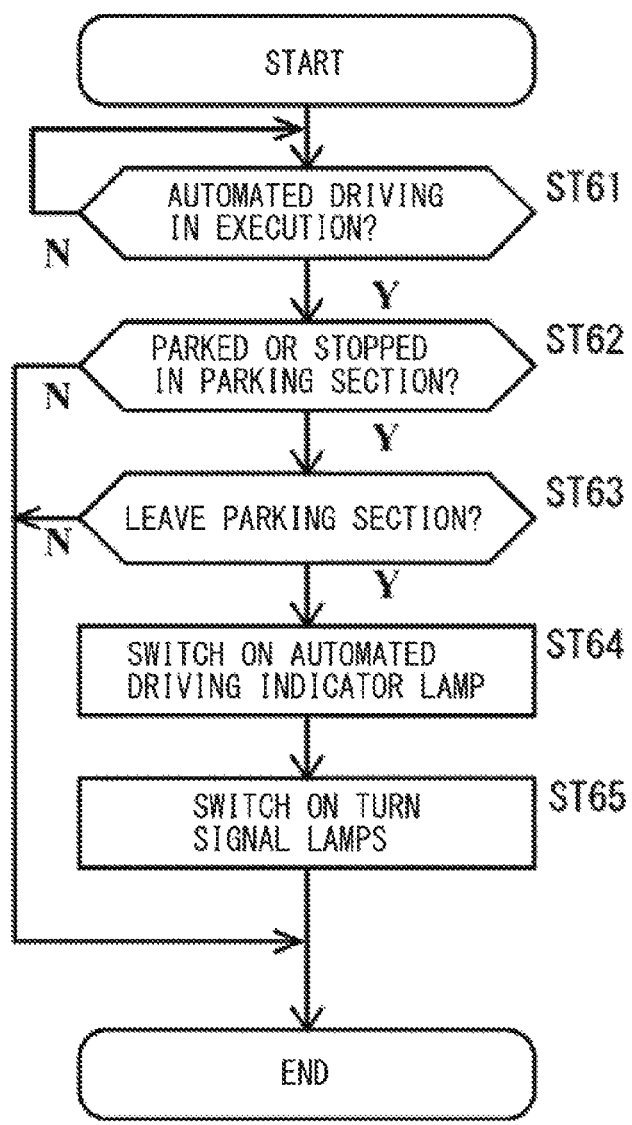
FIG. 7 is a flowchart of the lighting state control of the automated driving indicator lamp, in a case where the automobile leaves, by the automated driving, the parking section where the automobile has been parked.

FIG. 7 is a flowchart of the lighting state control of the automated driving indicator lamp 5, in a case where the automobile 1 leaves the parking section where the automobile 1 has been parked.

The lamp ECU 19 may repeatedly execute processing of FIG. 7, while keeping on acquiring the notification data, in the case where the automobile 1 is parked and stopped in the parking section by the automated driving.

In one embodiment of the technology, the lamp ECU 19 may serve as the "lamp controller".

In step ST61, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST61), the lamp ECU 19 may repeat the determination process of step ST61. In a case where the automated driving is in execution (Y in step ST61), the lamp ECU 19 may cause the processing to proceed to step ST62.

In step ST62, the lamp ECU 19 may determine whether or not the automobile 1 is parked or stopped in the parking section of the parking lot. For example, in a case where the automobile 1 is parked or stopped in the automatic parking mode, the lamp ECU 19 may determine that the automobile 1 is parked or stopped in the parking section of the parking lot (Y in step ST62), and cause the processing to proceed to step ST63. In a case where the lamp ECU 19 does not determine that the automobile 1 is parked or stopped in the parking section of the parking lot (N in step ST62), the lamp ECU 19 may terminate the processing of FIG. 7.

In step ST63, the lamp ECU 19 may determine whether or not the automobile 1 is about to leave the parking section where the automobile 1 is parked or stopped. For example, in a case where the detection ECU 16 detects a new occupant getting in the automobile 1 parked or stopped, the lamp ECU 19 may determine that the automobile 1 is about to leave the parking section on the basis of the notification data detected by the detection ECU 16 (Y in step ST62), and cause the processing to proceed to step ST64. In a case where the automobile 1 is not about to leave the parking section (N in step ST63), the lamp ECU 19 may terminate the processing of FIG. 7.

In step ST64, the lamp ECU 19 may switch on the automated driving indicator lamp 5 that has been off while the automobile 1 is parked and stopped.

In step ST65, the lamp ECU 19 may switch on the turn signal lamps 52 to indicate a direction in which the automobile 1 is going to leave the parking section, after switching on the automated driving indicator lamp 5.

As described, in the automatic parking mode in which the automobile 1 leaves the parking section, first, the lamp ECU 19 may switch on the automated driving indicator lamp 5, and afterwards, switch on the turn signal lamps 52 to indicate the direction in which the automobile 1 is going to leave the parking section. Switching on the automated driving indicator lamp 5 makes it possible for those around the automobile 1, e.g., the occupant of the surrounding automobile 2 and the pedestrian 3, to understand that the automobile 1 is about to leave the parking section by the automated driving. Furthermore, switching on the turn signal lamps 52 makes it possible for those around the automobile 1, e.g., the occupant of the surrounding automobile 2 and the pedestrian 3, to understand the direction in which the automobile 1 is going to start moving by the automated driving.

As described, in this embodiment, the automated driving and driver assistance ECU 14 is configured to control the travel of the automobile 1 by the automated driving in the normal movement mode and in the automatic parking mode. The normal movement mode includes allowing the automobile 1 to travel, and the automatic parking mode includes parking the automobile 1 by the automated driving in the parking lot.

The lamp ECU 19 is configured to control the lighting state of the automated driving indicator lamp 5 during the execution of the automated driving to the first lighting state, e.g., the continuous illumination, in the normal movement mode, and to the second lighting state different from the first lighting state, e.g., the flicker, in the automatic parking mode.

This makes it possible for those traveling around the automobile 1 in the attempt of parking by the automated driving, e.g., surrounding automobiles and their occupants, to easily understand that the automobile 1 is going to park by the automated driving, with the clue of the second lighting state of the automated driving indicator lamp 5 different from the first lighting state on the occasion of the movement by the normal automated driving. Hence, it is possible for those traveling around the automobile 1, e.g., the surrounding automobiles and their occupants, to be careful of and cope with irregular movements of the automobile 1 in the attempt of parking by the automated driving.

In contrast, in a case of controlling the automated driving from the movement to the parking in a single mode, it would not be easy to change the lighting state of the automated driving indicator lamp 5 in the travel control in the parking lot where the course of the automobile 1 is likely to cross, for example, courses of surrounding moving bodies. In this case, changing the lighting state of the automated driving indicator lamp 5 regarding the travel control in the parking lot would involve providing special equipment at an entrance and an exit of the parking lot and/or preparing highly precise positional information regarding the parking lot. In this embodiment, it is possible to change the lighting state of the automated driving indicator lamp 5 regarding the travel control in the parking lot, without such equipment and/or the highly precise positional information.

In particular, in the automatic parking mode on the occasion of the entrance into the parking section of the parking lot, the lamp ECU 19 may switch the lighting state of the automated driving indicator lamp 5, between in the movement control to the parking section of the parking lot, and in the entrance control into the parking section after spotting the parking section.

In one alternative, in the automatic parking mode on the occasion of the entrance into the parking section of the parking lot, the lamp ECU 19 may switch the lighting state of the automated driving indicator lamp 5, between in search of the parking section of the parking lot, in the movement control to the parking section spotted, and in the entrance control into the parking section.

This makes it possible for those traveling around the automobile 1, e.g., surrounding automobiles and their occupants, to easily and visually distinguish whether the automobile 1 is going to move in the parking lot by the automated driving, or whether the automobile 1 is going to enter the parking section. Hence, it is possible for those traveling around the automobile 1, e.g., surrounding automobiles and their occupants, to take countermeasures in accordance with the results. Bringing the automated driving indicator lamp 5 into such a special lighting state makes it possible to be careful of and cope with unusual movements on the occasion of the entrance into the parking section. For example, let us assume a case where the automobile 1 spots the parking section while moving in search of the parking section, makes an urgent stop, and thereafter, starts an immediate backward movement. Bringing the automated driving indicator lamp 5 to the special lighting state in the entrance control makes it highly probable for those traveling around the automobile 1, e.g., surrounding automobiles and their occupants, to cope with such a case, leading to suppression an unanticipated incident due to insufficient communication. Moreover, it is possible for the automobile 1 to park automatically with enhanced safety in the parking lot where the automobile 1 is likely to make irregular movements, without giving the feeling of unsafety to those around the automobile 1, e.g., pedestrians and surrounding automobiles.

Moreover, in this embodiment, in the automatic parking mode in which the automobile 1 leaves the parking section, the lamp ECU 19 may switch on the automated driving indicator lamp 5, and afterwards, switch on the turn signal lamps 52 to indicate the direction in which the automobile 1 is going to leave the parking section.

Hence, it is possible for those traveling around the automobile 1 in the attempt of leaving the parking section, e.g., surrounding automobiles and their occupants, to easily understand that the automobile 1 is going to leave the parking section by the automated driving, and the direction in which the automobile 1 is going to leave the parking section by the automated driving.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

The automated driving and driver assistance ECU 14 and the lamp ECU 19 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving and driver assistance ECU 14 and the lamp ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving and driver assistance ECU 14 and the lamp ECU 19 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An automated driving enabled vehicle comprising:
    a travel controller configured to control travel of the vehicle while switching a travel control state between automated driving and manual driving;
    an automated driving indicator lamp configured to be switched on perceptibly from outside the vehicle under the automated driving; and
    a lamp controller configured to switch on the automated driving indicator lamp to indicate that the travel control state is the automated driving, during execution of the automated driving in which the travel controller controls the travel of the vehicle by the automated driving,
    wherein the travel controller is configured to control the travel of the vehicle by the automated driving in a normal movement mode and in an automatic parking mode, the normal movement mode including allowing the vehicle to travel, and the automatic parking mode including parking the vehicle by the automated driving in a parking lot,
    wherein the lamp controller is configured to control a lighting state of the automated driving indicator lamp during the execution of the automated driving to a first lighting state in the normal movement mode, and to a second lighting state different from the first lighting state in the automatic parking mode,
    wherein the automated driving enabled vehicle further comprises a turn signal lamp configured to be switched on perceptibly from outside the vehicle, and
    wherein, in the automatic parking mode in which the vehicle is about to leave a parking section of the parking lot, the lamp controller is configured to switch on the automated driving indicator lamp, and afterwards, switch on the turn signal lamp to indicate a direction in which the vehicle is going to leave the parking section.

2. The automated driving enabled vehicle according to claim 1, wherein, in the automatic parking mode, the lamp controller is configured to switch the lighting state of the automated driving indicator lamp, between in a movement control to a parking section of the parking lot, and in an entrance control into the parking section.

3. The automated driving enabled vehicle according to claim 2, wherein in the automatic parking mode, the lamp controller is configured to switch the lighting state of the automated driving indicator lamp, between in search of a parking section of the parking lot, in a movement control to the parking section, and in an entrance control into the parking section.

4. The automated driving enabled vehicle according to claim 3, wherein the travel controller is configured to
    acquire positional information regarding the vehicle to determine whether or not the vehicle is located in the parking lot,
    control the vehicle in the automatic parking mode on a condition that the vehicle is located in the parking lot, and
    control the vehicle in the normal movement mode on a condition that the vehicle is located otherwise than in the parking lot.

5. The automated driving enabled vehicle according to claim 2, wherein the travel controller is configured to
    acquire positional information regarding the vehicle to determine whether or not the vehicle is located in the parking lot,
    control the vehicle in the automatic parking mode on a condition that the vehicle is located in the parking lot, and
    control the vehicle in the normal movement mode on a condition that the vehicle is located otherwise than in the parking lot.

6. The automated driving enabled vehicle according to claim 1, wherein, in the automatic parking mode, the lamp controller is configured to switch the lighting state of the automated driving indicator lamp, between in search of a parking section of the parking lot, in a movement control to the parking section, and in an entrance control into the parking section.

7. The automated driving enabled vehicle according to claim 6, wherein the travel controller is configured to
    acquire positional information regarding the vehicle to determine whether or not the vehicle is located in the parking lot,
    control the vehicle in the automatic parking mode on a condition that the vehicle is located in the parking lot, and
    control the vehicle in the normal movement mode on a condition that the vehicle is located otherwise than in the parking lot.

8. The automated driving enabled vehicle according to claim 1, wherein the travel controller is configured to
    acquire positional information regarding the vehicle to determine whether or not the vehicle is located in the parking lot,
    control the vehicle in the automatic parking mode on a condition that the vehicle is located in the parking lot, and
    control the vehicle in the normal movement mode on a condition that the vehicle is located otherwise than in the parking lot.

* * * * *